(12) United States Patent
Rebiere et al.

(10) Patent No.: US 11,979,189 B2
(45) Date of Patent: May 7, 2024

(54) INFRASTRUCTURE FOR TRANSPORTING RADIO-FREQUENCY DATA VIA OPTICAL FIBERS

(71) Applicant: LATELEC, Toulouse (FR)

(72) Inventors: Yoann Rebiere, Ramonville (FR); Alexandre Bacou, Saint Porquier (FR)

(73) Assignee: LATELEC, Toulouse (FR)

( * ) Notice: Subject to any disclaimer, the term of this patent is extended or adjusted under 35 U.S.C. 154(b) by 70 days.

(21) Appl. No.: 17/784,874

(22) PCT Filed: Dec. 16, 2020

(86) PCT No.: PCT/EP2020/086492
§ 371 (c)(1),
(2) Date: Jun. 13, 2022

(87) PCT Pub. No.: WO2021/122795
PCT Pub. Date: Jun. 24, 2021

(65) Prior Publication Data
US 2023/0009703 A1 Jan. 12, 2023

(30) Foreign Application Priority Data
Dec. 17, 2019 (FR) ........................................ 1914594

(51) Int. Cl.
*H04B 10/2575* (2013.01)
(52) U.S. Cl.
CPC .............................. *H04B 10/25753* (2013.01)
(58) Field of Classification Search
CPC .............................................. H04B 10/25753

USPC ......................................................... 398/116
See application file for complete search history.

(56) References Cited

U.S. PATENT DOCUMENTS

| | | | | |
|---|---|---|---|---|
| 6,577,419 B1 * | 6/2003 | Hall | ...................... | H04B 10/40 398/115 |
| 6,801,767 B1 * | 10/2004 | Schwartz | ......... | H04B 10/25755 455/426.2 |
| 8,750,708 B2 * | 6/2014 | Fuss | .................... | H04B 10/2575 398/115 |
| 10,425,150 B1 * | 9/2019 | Earnhardt, Jr. | ..... | H04B 7/18508 |
| 2007/0223928 A1 * | 9/2007 | Farmer | .............. | H04Q 11/0067 398/116 |
| 2013/0332978 A1 * | 12/2013 | Rakib | ................ | H04N 21/6168 725/127 |

(Continued)

FOREIGN PATENT DOCUMENTS

| | | | | | |
|---|---|---|---|---|---|
| CA | 2911944 | C | * | 3/2019 | ......... H04B 10/2503 |
| CA | 3021725 | A1 | * | 4/2019 | ......... H04B 10/2575 |

(Continued)

OTHER PUBLICATIONS

Chand et al; ;An approach to reducing swap and cost for Avionics high speed optical data networks; Dec. 2008; IEEE; pp. 1-8. (Year: 2008).*

(Continued)

*Primary Examiner* — Amritbir K Sandhu
(74) *Attorney, Agent, or Firm* — H&I PARTNERS; C. Andrew Im; Chai Im

(57) ABSTRACT

A radio-frequency data transport infrastructure for transmitting radio-frequency data to and from equipment via optical fibers. Such data transport infrastructure being particularly suitable for equipping an aircraft.

10 Claims, 3 Drawing Sheets

(56) References Cited

U.S. PATENT DOCUMENTS

| | | | |
|---|---|---|---|
| 2015/0341113 A1* | 11/2015 | Krug | H04B 10/116 398/118 |
| 2021/0195720 A1 | 6/2021 | Delame et al. | |
| 2021/0250095 A1* | 8/2021 | Wojnar | H04B 10/25752 |
| 2022/0029728 A1* | 1/2022 | Rebiere | H04J 14/0212 |
| 2023/0009703 A1* | 1/2023 | Rebiere | H04B 10/25756 |

FOREIGN PATENT DOCUMENTS

| | | |
|---|---|---|
| EP | 1227605 A2 | 7/2002 |
| WO | 2019224377 A1 | 11/2019 |

OTHER PUBLICATIONS

Radiall et al; In-flight fiber optics; Aug. 2017; Radiall Incorporation; pp. 1-3. (Year: 2017).*

* cited by examiner

INFRASTRUCTURE FOR TRANSPORTING RADIO-FREQUENCY DATA VIA OPTICAL FIBERS

RELATED APPLICATIONS

This application is a § 371 application of PCT/EP2020/086492 filed Dec. 16, 2020, which claims priority from French Patent Application No. 1914594 filed Dec. 17, 2019, each of which is incorporated herein by reference in its entirety.

FIELD OF THE INVENTION

The present invention relates to an infrastructure for transporting radio-frequency data. In particular, the infrastructure for transporting radio-frequency data can be in particular on board a means of transportation in order to allow the use of the equipment in said means of transportation. The invention has in particular an advantageous use in the aeronautical field, particularly to equip passenger cabins of an aircraft.

BACKGROUND OF THE INVENTION

In order to interconnect equipment of an aircraft to each other for communication purposes, current aircraft are equipped with numerous and various wirings forming a communication network, the installation and maintenance of which can turn out to be complex.

The wirings, mainly electric, are thus generally installed throughout the cabin in zones that are sometimes not very accessible, generally disposed under the floor or in the ceiling. These wirings must further be perfectly maintained and protected, in particular from aggressions capable of damaging them, for example such as vibrations, projections of liquid, high temperatures, electromagnetic radiation . . .

Moreover, each piece of equipment distributing data to the cabin uses a specific wiring according to the desired use.

In particular, in order to carry radio-frequency data useful to the operation of connected equipment, for example such as mobile telephones, wireless temperature sensors, presence sensors . . . , aircraft are equipped with specific cables, called radiating coaxial cables, installed throughout the cabin.

As a reminder, a radiating coaxial cable is a coaxial cable with a pattern of periodic slots in the outer conductor, slots through which radio-frequency signals can radiate towards the outside and towards the inside of the cable. The radio-frequency signals are thus transmitted simultaneously along the cable and into the surrounding space. A radiating coaxial cable operates simultaneously as a transmission line and as an antenna.

However, these radiating coaxial cables have a significant cost, whether in terms of price, in terms of installation time and constraints (a minimum radius of curvature of 50 mm is required), in terms of bulk (a radiating coaxial cable has a diameter of approximately 8 mm), or in terms of weight (a radiating coaxial cable weighs approximately 8.5 kg/100 m), the weight affecting the weight balance of the aircraft.

OBJECT AND SUMMARY OF THE INVENTION

The present invention aims to overcome the aforementioned disadvantages.

For this purpose, the present invention proposes a radio-frequency data transport infrastructure intended for the transmission of radio-frequency data to equipment, in a direction "of the downstream flow", and for the transmission of radio-frequency data from the equipment, in a direction "of the upstream flow".

Radio-frequency data means data emitted preferably in the range of frequencies between 400 MHz and 100 GHz, even more preferably between 400 MHz and 6 GHz.

The radio-frequency data transport infrastructure includes a concentration and configuration box, S interface boxes, N optical fibers.

The concentration and configuration box includes:
- a first device for frequency filtering, configured to, in the direction of the downstream flow, decompose a first signal, called entering signal, into N sub-signals, called entering sub-signals, in N distinct sub-bands of frequencies, N being an integer$\geq 2$,
- N modules for converting electric/optical signals, each conversion module being configured, in the direction of the downstream flow, to respectively convert an entering sub-signal into an optical signal, called entering optical signal, having a given wavelength.

The signal entering the concentration and configuration box is preferably a radio-frequency analogue electric signal.

The first filtering device of the concentration and configuration box is a device that allows, in the direction of the downstream flow, to separate, in the entering signal, the signals that have a frequency in a defined band of frequencies and the signals that have a frequency in another defined band of frequencies and respectively transport them to a module for converting electric/optical signals.

Preferably, the first and the second sub-band of frequencies cover the band of frequencies between 400 MHz and 6 GHz.

The concentration and configuration box includes as many conversion modules as there are entering sub-signals.

The concentration and configuration box are coupled, via N optical fibers, to S interface boxes disposed in series, S being an integer$\geq 2$.

The number of optical fibers corresponds to the number of conversion modules of the concentration and configuration box.

Each interface box includes:
- N 1×2 optical couplers,
- N units for converting electric/optical signals,
- a device for signal recomposition, called second recomposition device.

Each interface box includes as many conversion units as optical fibers.

Each optical coupler is configured, in the direction of the downstream flow, to respectively transmit a part of an entering optical signal to a unit for converting electric/optical signals, each unit for converting electric/optical signals being configured, in the direction of the downstream flow, to respectively reconvert an entering optical signal into an entering sub-signal.

The second recomposition device is configured to recompose the entering signal from the N entering sub-signals obtained by the N units for converting electric/optical signals.

The recomposed entering signal is intended to be transmitted to all or a part of the equipment. Preferably, the recomposed entering signal is intended to be transmitted to an antenna configured to transmit said recomposed entering signal to all or a part of the equipment.

Such a radio-frequency data transport infrastructure advantageously allows to transport radio-frequency data to equipment, via optical fibers.

Such a radio-frequency data transport infrastructure allows to eliminate the use of radiating coaxial cables.

The equipment targeted can advantageously be smart objects or personal electronic equipment, for example such as mobile telephones, tablets.

According to specific embodiments, the radio-frequency data transport infrastructure according to the invention further satisfies the following characteristics, implemented separately or in each of their technically effective combinations.

In preferred embodiments of the invention, each interface box includes a second device for frequency filtering, configured to, in the direction of the upstream flow, decompose a second signal, called exiting signal, into N sub-signals, called exiting sub-signals, in N distinct sub-bands of frequencies.

The exiting signal is preferably a radio-frequency analogue electric signal coming from one or more pieces of equipment. This exiting signal is preferably sensed by at least one antenna located near the piece(s) of equipment.

The second filtering device of the interface box is a device that allows, in the direction of the upstream flow, to separate the signals that have a frequency in a defined band of frequencies and the signals that have a frequency in another defined band of frequencies and respectively transport them to a unit for converting electric/optical signals.

Preferably, the first and the second sub-band of frequencies cover the band of frequencies between 400 MHz and 6 GHz.

Each interface box includes as many conversion units as there are exiting sub-signals.

Each unit for converting electric/optical signals is configured, in the direction of the upstream flow, to respectively convert an exiting sub-signal, coming from the second filtering device, into an optical signal, called exiting optical signal, having a given wavelength, distinct from the wavelength of the entering optical signal.

Each exiting optical signal is respectively transmitted, by an optical fiber, to a module for converting electric/optical signals of the concentration and configuration box, each module for converting electric/optical signals being configured, in the direction of the upstream flow, to respectively reconvert an exiting optical signal into an exiting sub-signal.

The concentration and configuration box includes a signal recomposition device, called first recomposition device, configured to recompose the exiting signal from the N exiting sub-signals obtained by the N modules for converting electric/optical signals.

Preferably, the radio-frequency data transport infrastructure is configured to decompose an exiting signal into as many exiting sub-signals as there are entering sub-signals coming from the decomposition of the entering signal.

The optical fibers used for the upstream flow are advantageously those used for the downstream flow.

Such a radio-frequency data transport infrastructure advantageously allows the transport of radio-frequency data in a bidirectional manner.

Such a radio-frequency data transport infrastructure is particularly adapted to the mobile network.

According to specific embodiments, each module for converting electric/optical signals includes:
a laser source, called first laser source,
a photodiode, called first photodiode,
a wavelength multiplexer, called first multiplexer.

Such modules for converting electric/optical signals include conventional components, not very bulky and simple to use.

In alternative embodiments, the first multiplexers are independent of the modules for converting electric/optical signals.

According to specific embodiments, each unit for converting electric/optical signals includes:
a laser source, called second laser source,
a photodiode, called second photodiode,
a wavelength multiplexer, called second multiplexer.

Such units for converting electric/optical signals include conventional components, not very bulky and simple to use.

In alternative embodiments, the second multiplexers are independent of the units for converting electric/optical signals.

According to specific embodiments, each unit for converting electric/optical signals includes a device for activating/deactivating the second laser source.

According to specific embodiments, each interface box includes a duplexer intended to be arranged between the second filtering device of said interface box and the antenna associated with said interface box. Such a duplexer advantageously allows to use the same single antenna for the emission and the reception of a radio-frequency analogue electric signal.

According to specific embodiments, each interface box includes a first parameterisable gain amplifier arranged between the second recomposition device and the duplexer or, when the interface box does not include a duplexer, between the second recomposition device and the antenna. Such a first parameterisable gain amplifier advantageously allows to homogenise the power of the entering signals at the output of each interface box.

According to specific embodiments, each interface box includes a second parameterisable gain amplifier arranged between the second filtering device and the duplexer or, when the interface box does not include a duplexer, between the second filtering device and the antenna. Such a second parameterisable gain amplifier advantageously allows to increase if necessary the power of the exiting signal in each interface box.

According to specific embodiments, the first filtering device of the concentration and configuration box and/or the first recomposition device of the concentration and configuration box and/or the second filtering device of an interface box and/or the second recomposition device of an interface box is in the form of a diplexer.

According to specific embodiments, the first filtering device of the concentration and configuration box and/or the first recomposition device of the concentration and configuration box and/or the second filtering device of an interface box and/or the second recomposition device of an interface box is in the form of a triplexer.

The invention also relates to an aircraft including a radio-frequency data transport infrastructure according to at least one of its embodiments.

In specific exemplary embodiments, the entering signal can represent the totality of the radio-frequency analogue electric signals, coming from various central service units, which have been combined, for example by a radio-frequency combiner. Each central service unit brings together and manages data, in particular radio-frequency, relative to a specific service in the aircraft.

In specific exemplary embodiments, the entering signal can represent a radio-frequency analogue electric signal coming from a single one of the central service units. In this case, it is necessary to duplicate, for each of the other central service units, the concentration and configuration box, the interface boxes coupled to said concentration and configuration box and the antennas coupled to each interface box.

BRIEF DESCRIPTION OF THE DRAWINGS

The invention will be better understood upon reading the following description, given as an example that is in no way limiting, and made in reference to the appended drawings.

DETAILED DESCRIPTION OF AN EMBODIMENT OF THE INVENTION

The present invention relates to a radio-frequency data transport infrastructure 1.

The radio-frequency data transport infrastructure 1 can, in general, equip any means of transportation, in particular those in the aeronautical, rail or automobile fields, without this being restrictive of the invention. It is also possible to install such a radio-frequency data transport infrastructure 1 in buildings.

The invention is described in the specific context of one its preferred fields of use in which the radio-frequency data transport infrastructure 1 is on board a civilian airliner. Nothing excludes, however, disposing the radio-frequency data transport infrastructure 1 in any other type of aircraft, whether it be civilian or military.

This radio-frequency data transport infrastructure 1 can in particular advantageously be integrated into a structure for managing data.

Figure 1:
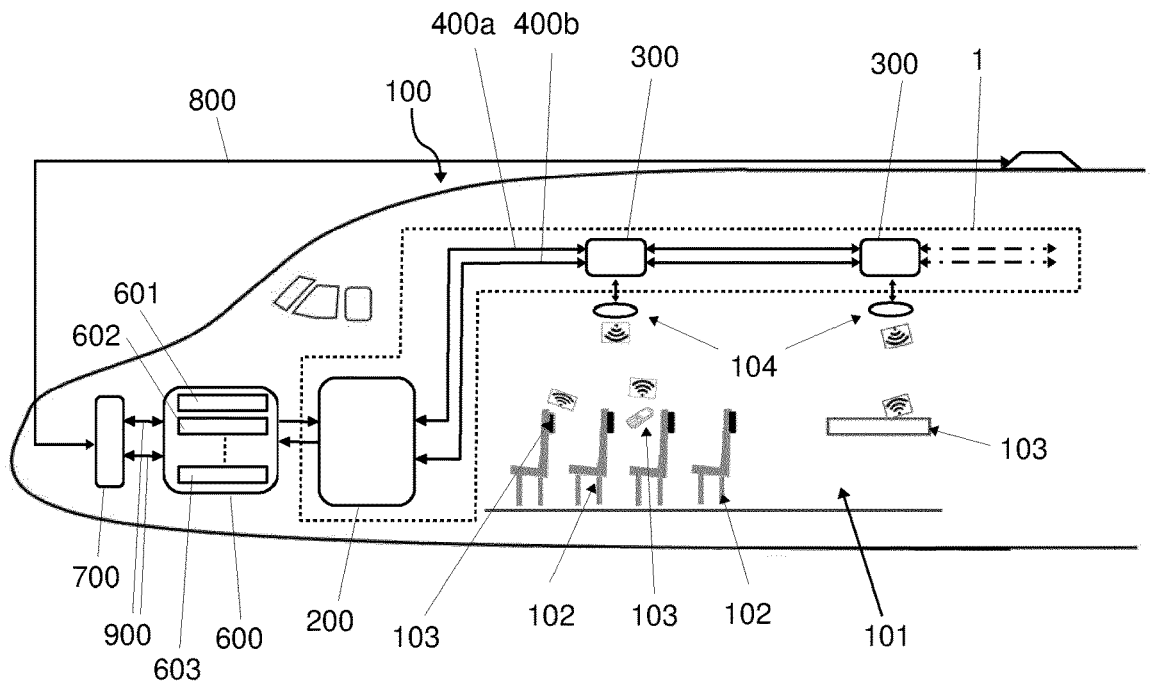
FIG. 1 shows an example of a structure for managing data on board an airplane, including a radio-frequency data transport infrastructure according to an embodiment of the invention.

FIG. 1 schematically shows a non-limiting example of a structure for managing data on board an airplane 100. The airplane 100 includes, conventionally, a cabin 101 for receiving passengers and is equipped, inter alia, with passenger seats 102.

The structure for managing data is intended to allow a transmission of data to and from equipment 103.

The equipment 103 can be of a various nature:
terminals (fixed screens) integrated into the passenger seats 102,
personal electronic equipment, known by the acronym PED ("Personal Electronic Device"), belonging to the passengers,
critical and non-critical technical equipment for the flight (pump actuators, temperature or pressure sensors, smoke detectors, etc.).

All of this equipment 103 is preferably disposed in the cabin 101.

The pieces of equipment can dialogue with each other via several categories of networks: 2G/3G/4G, Zigbee, Sigfox, LoRa, Wi-Fi . . .

The structure for managing data includes:
a data resource block 600,
a radio-frequency data transport infrastructure 1.

The structure for managing data can further include a router 700 configured for example to communicate, in a bidirectional manner (arrow 800), with a SATCOM satellite communication network, as illustrated in FIG. 1. The router 700 is also configured to dissociate the various types of data to be transmitted to the data resource block 600. The router 700 is also configured for example to communicate, in a bidirectional manner (arrows 900), radio-frequency electric signals, preferably analogue, with the data resource block 600.

The data resource block 600 includes a plurality of central units, called central service units 601, 602, 603, each central service unit bringing together and managing the data, in particular radio-frequency, relative to a specific service in the airplane 100.

In an exemplary embodiment, a service is associated with an entertainment system, known by the acronym IFE (In-Flight Entertainment), in particular linked to the terminals.

In another exemplary embodiment, a service is associated with a communication system (Internet or mobile network, for example), in particular linked to the terminals and the PED equipment.

In another exemplary embodiment, a service is associated with a cabin system, in particular linked to the critical and/or non-critical technical equipment for the flight.

In the example of FIG. 1, the data resource block 600 includes three central service units 601, 602, 603.

The data resource block 600 is preferably disposed in an avionics bay of the airplane. The data resource block 600 can be for example in the form of several data servers.

The radio-frequency data transport infrastructure 1 advantageously allows the distribution, in the cabin 101, of downstream flows and of upstream flows of radio-frequency analogue data, respectively into and from the equipment 103 of the cabin 101.

Radio-frequency data means data preferably emitted in the range of frequencies between 400 MHz and 100 GHz, even more preferably between 400 MHz and 6 GHz.

The downstream flows allow the equipment 103 to use the radio-frequency analogue data coming from said central service units and the upstream flows allow to transfer the radio-frequency analogue data to said central service units from said equipment.

The radio-frequency data transport infrastructure 1 includes a concentration and configuration box 200 and at minimum two interface boxes 300. The concentration and configuration box 200 is connected to the various equipment 103 of the cabin 101 via the interface boxes 300 mounted in series.

Said concentration and configuration box is coupled to each interface box, via at least two optical fibers 400a, 400b. Each optical fiber 400a, 400b successively serves the interface boxes 300. Each interface box is respectively coupled to an antenna 104 itself coupled to all or a part of said equipment of the airplane. Preferably, the antennas 104 do not belong to the radio-frequency data transport infrastructure. In another embodiment, the antennas belong to the radio-frequency data transport infrastructure.

According to bidirectional transfers, the concentration and configuration box 200 communicates, on the one hand, radio-frequency analogue electric signals with the central units of the data resource block 600 and, on the other hand, optical signals with the interface boxes 300 via at least two optical fibers 400a, 400b.

According to bidirectional transfers, each interface box communicates, on the one hand, radio-frequency analogue electric signals with the associated respective antenna 104 and, on the other hand, optical signals with the concentration and configuration box 200 via said optical fibers 400a, 400b.

The radio-frequency data transport infrastructure 1 is preferably integrated, according to various embodiments, into the ceiling and/or the floor of the cabin 101.

Figure 2:
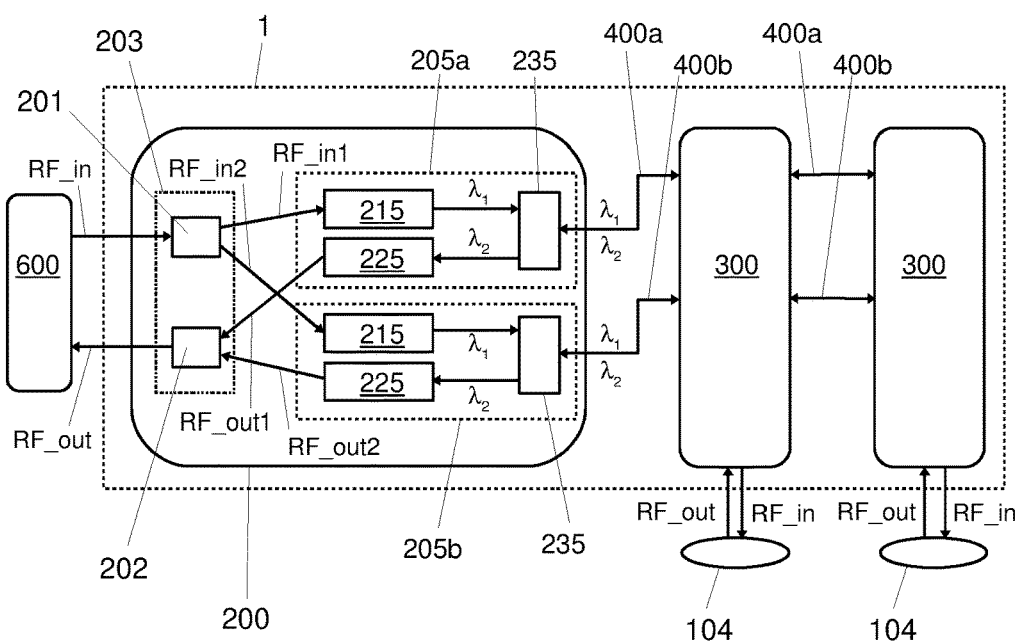
FIG. 2 shows an example of a concentration and configuration box of a radio-frequency data transport infrastructure according to a first embodiment of the invention.
Figure 5:
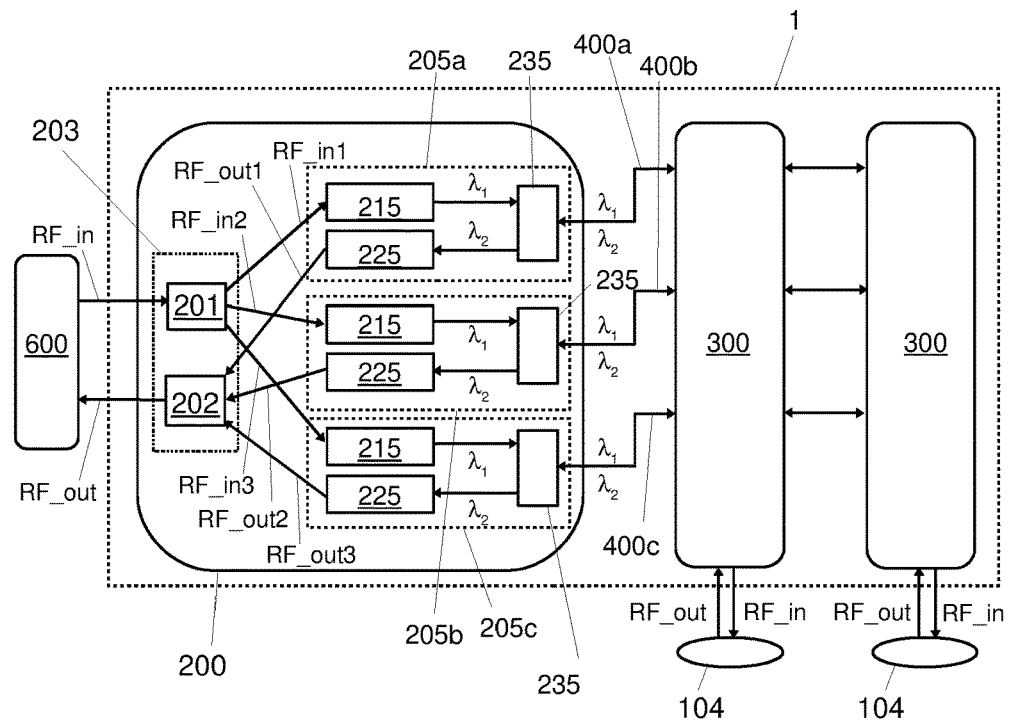
FIG. 5 shows an example of a concentration and configuration box of a radio-frequency data transport infrastructure according to a second embodiment of the invention.

The concentration and configuration box 200 preferably includes, as illustrated in FIGS. 2 and 5:
- a first filtering device 201 configured to decompose a first signal, called entering signal, into N sub-signals, called entering sub-signals, in N distinct sub-bands of frequencies, N being an integer≥2,
- N modules for converting electric/optical signals 205a, 205b, 205c,
- a first signal recomposition device 202.

Figure 4:
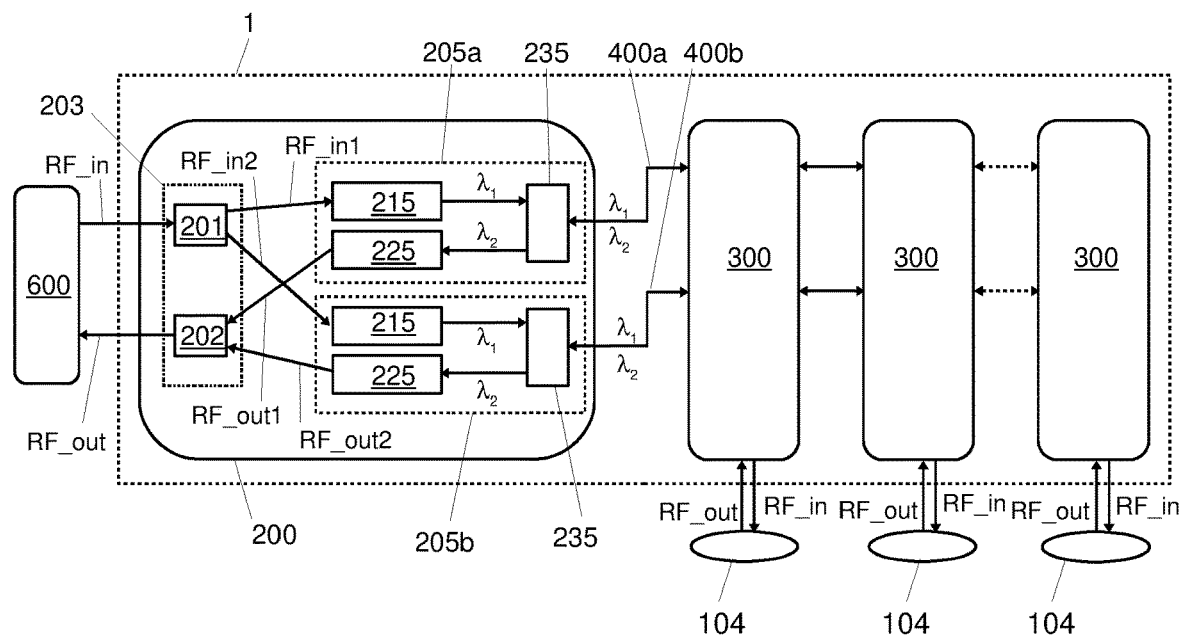
FIG. 4 shows an alternative embodiment of the first embodiment of the radio-frequency data transport infrastructure.

In the non-limiting example of FIGS. 2, 4 and 5, the first filtering device 201 and the first signal recomposition device 202 of the concentration and configuration box are preferably, but in a non-limiting manner, combined in a device 203, called first separation and combination device. Each conversion module 205a, 205b, 205c of the concentration and configuration box 200 includes:
- a laser source, called first laser source 215,
- a photodiode, called first photodiode 225,
- a wavelength multiplexer, called first multiplexer 235.

In an alternative embodiment, the first multiplexer 235 of each conversion module can be dissociated from the conversion module.

Preferably, all the conversion modules of the concentration and configuration box 200 are identical to each other.

Said concentration and configuration box is coupled, via N optical fibers, to S interface boxes, S being an integer≥2.

Each interface box preferably includes:
- N 1×2 optical couplers,
- N units for converting electric/optical signals 305a, 305b, 305c,
- a second filtering device 301 configured to decompose a second signal, called exiting signal, into N sub-signals, called exiting sub-signals, in N distinct sub-bands of frequencies,
- a second signal recomposition device 302.

Figure 3:
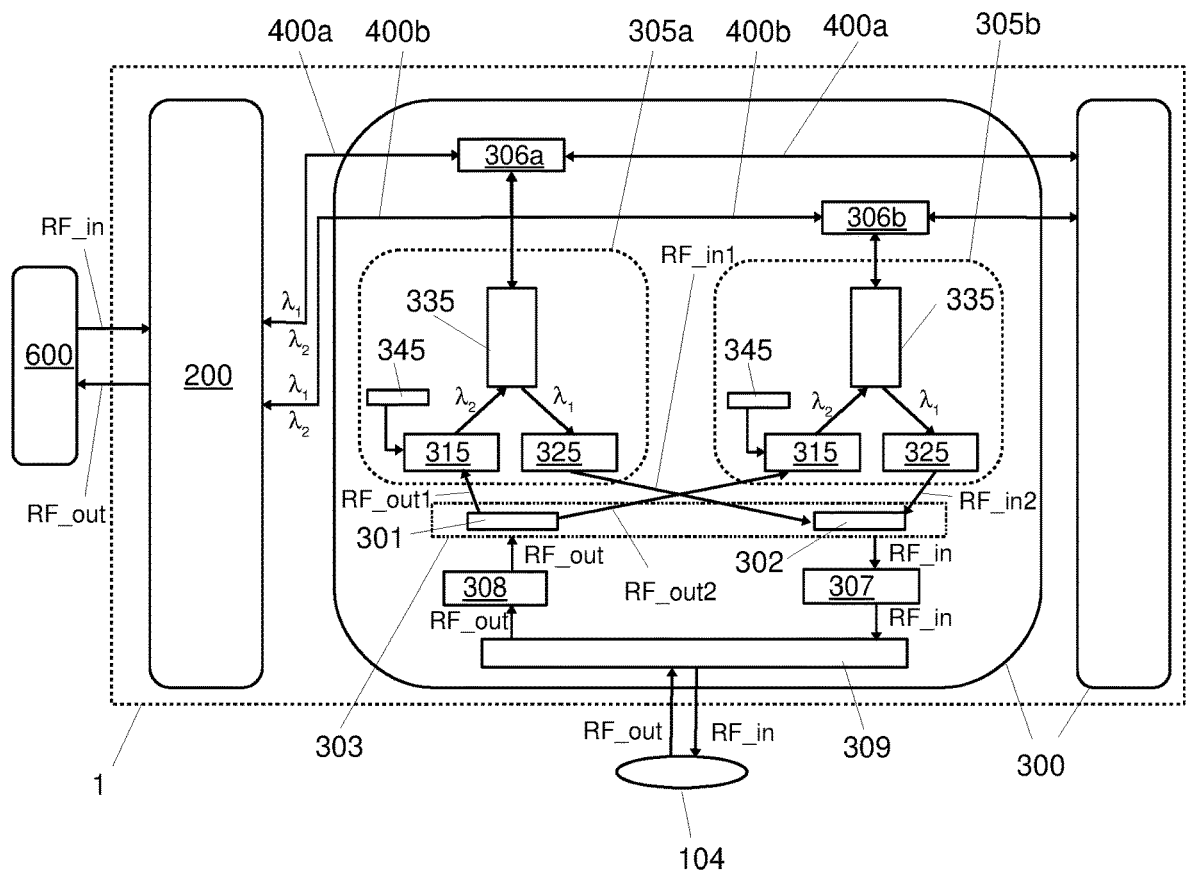
FIG. 3 shows an example of an interface box of FIG. 2, according to the first embodiment of the invention of the radio-frequency data transport infrastructure.
Figure 6:
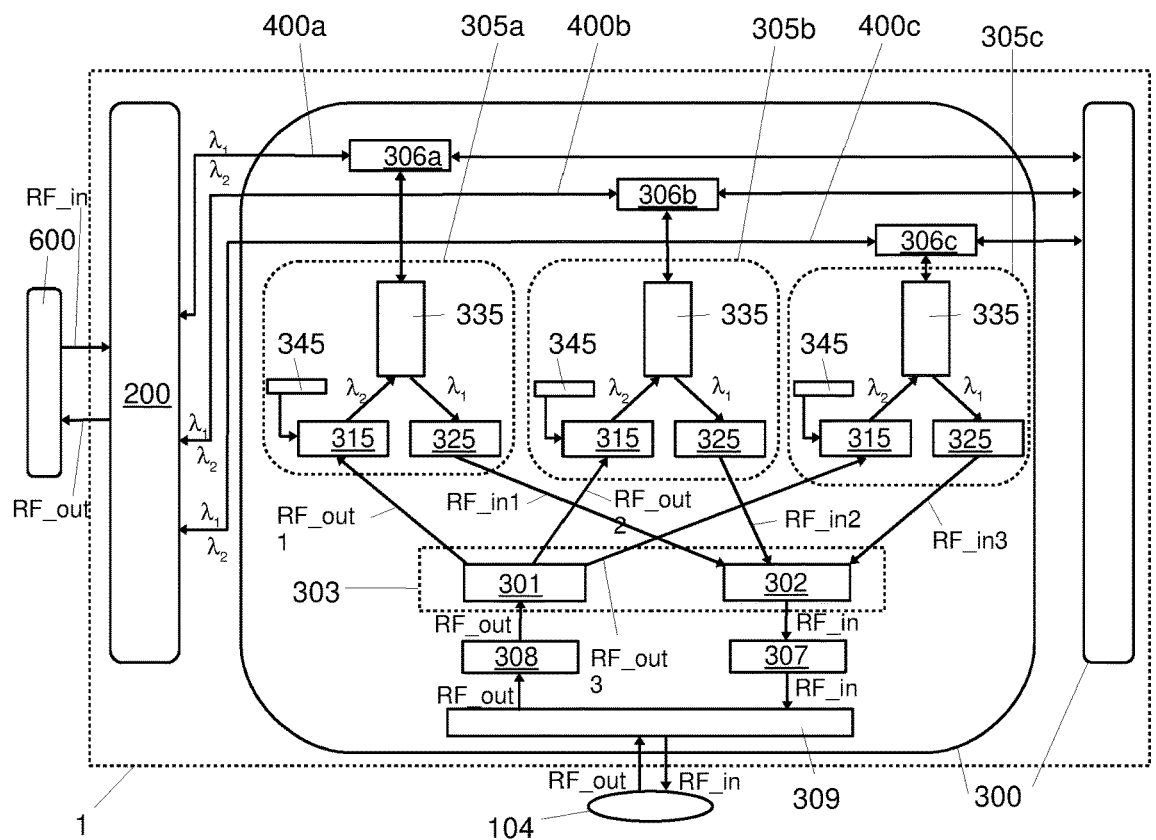
FIG. 6 shows an example of an interface box of FIG. 5, according to the second embodiment of the invention of the radio-frequency data transport infrastructure.

In the non-limiting example of FIGS. 3 and 6, the second filtering device 301 and the second signal recomposition device 302 of each interface box are preferably, but in a non-limiting manner, combined in a device 303, called second separation and combination device.

Each conversion unit 305a, 305b, 305c of an interface box 300 includes:
- a laser source, called second laser source 315,
- a photodiode, called second photodiode 325,
- a wavelength multiplexer, called second multiplexer 355.

In an alternative embodiment, the second multiplexer 335 of each conversion unit can be dissociated from the conversion unit.

Each conversion unit 305a, 305b, 305c of an interface box 300 can preferably include a device 345 for activating/deactivating the second laser source 315.

Preferably, all the conversion units of the interface boxes 300 are identical to each other.

Preferably, all the interface boxes 300 of the radio-frequency data transport infrastructure 1 are identical to each other.

The radio-frequency data transport infrastructure 1 will now be described in a detailed manner in a first embodiment, illustrated by FIGS. 2 to 4, in which the number N is equal to 2. The first filtering device 201 and the first signal recomposition device 202 of the concentration and configuration box are each advantageously in the form of a diplexer. The second filtering device 301 and the second signal recomposition device 302 of each interface box are also each in the form of a diplexer.

FIGS. 2 and 3 illustrate the example in which the number S of interface boxes 300 is 2. FIG. 4 illustrates the example in which the number S of interface boxes 300 is at least 3.

In this first embodiment, the concentration and configuration box 200 thus has, as illustrated in FIG. 2:
- the first filtering device 201, in the form of a diplexer,
- two modules for converting electric/optical signals, called first 205a and second 205b conversion modules,
- the first signal recomposition device 202, in the form of a diplexer.

Preferably, the first filtering device 201 is preferably of the low pass/high pass type.

Each interface box 300 includes, as illustrated in FIG. 3:
- two 1×2 optical couplers, called first 306a and second 306b couplers,
- two units for converting electric/optical signals, called first 305a and second 305b conversion units,
- the second filtering device 301, in the form of a diplexer,
- the second signal recomposition device 302, in the form of a diplexer.

Preferably, the second filtering device 301 is preferably of the low pass/high pass type.

The role and the operation of the various elements composing the radio-frequency data transport infrastructure will be described first for a transmission of radio-frequency data in the direction of a downstream flow (from the data resource block 600 to the antennas 104 located in the cabin 101) and secondly for a transmission of radio-frequency data in the direction of an upstream flow (from the antennas 104 located in the cabin 101 of the airplane 100 to the data resource block 600).

Direction of the Downstream Flow

The first filtering device 201 of the concentration and configuration box is arranged and configured to receive a radio-frequency analogue electric signal, called entering signal RF_in.

In a first embodiment, non-limiting, the entering signal RF_in can represent the totality of the radio-frequency analogue electric signals coming from the various central service units 601, 602, 603, which have been combined.

In such a first embodiment, a radio-frequency combiner is preferably used to combine all the radio-frequency analogue electric signals coming from the various central service units 601, 602, 603 into a single signal, the entering signal RF_in.

In a first form of implementation of this first embodiment, the data resource block 600 includes the radio-frequency combiner, disposed at the output of the various central service units 601, 602, 603.

In a second form of implementation of this first version, the concentration and configuration box include the radio-frequency combiner, disposed upstream of the first separation and combination device 203.

In a second embodiment, non-limiting, the entering signal RF_in can represent a radio-frequency analogue electric signal coming from a single one of the central service units.

In this second embodiment, it is necessary to duplicate, for each of the other central service units, the concentration and configuration box 200, the interface boxes 300 coupled to said concentration and configuration box 200 and the antennas 104 coupled to each interface box.

In the example illustrated in FIGS. 1 to 5, and in a non-limiting manner, it is considered that the entering signal RF_in represents the totality of the radio-frequency analogue electric signals coming from the various central service units 601, 602, 603, which have been combined. The radio-frequency combiner is disposed in the data resource block 600. The entering signal RF_in thus comes from the data resource block 600, as illustrated in FIGS. 2 to 5.

The first filtering device 201 of the concentration and configuration box 200 is arranged and configured to filter, on the basis of the radio frequencies, the entering signal RF_in into:
- a first entering sub-signal RF_in1, the frequency of which is located in a first sub-band of frequencies, and
- a second entering sub-signal RF_in2, the frequency of which is located in a second sub-band of frequencies.

The first and second entering sub-signals RF_in1, RF_in2 are respectively transmitted to the first conversion module 205*a* and to the second conversion module 205*b*.

The first and second sub-bands of frequencies are distinct and without overlap.

Preferably, the first and the second sub-band of frequencies cover the band of frequencies between 400 MHz and 6 GHz.

In a preferred exemplary embodiment, the first sub-band of frequencies corresponds to the range of frequencies between 400 MHz and 999.9 MHz and the second sub-band of frequencies corresponds to the range of frequencies between 1 and 6 GHz.

In other words, the first filtering device 201 of the concentration and configuration box is a device that allows, in the direction of the downstream flow, to separate the signals that have a frequency in a defined band of frequencies and the signals that have a frequency in another defined band of frequencies and transport them on two different paths.

The role of each conversion module of the concentration and configuration box 200, in the direction of the downstream flow, is to convert received radio-frequency analogue electric signals into optical signals.

The first conversion module 205*a* advantageously converts the first entering sub-signal RF_in1 coming from the first filtering device 201 into a first entering optical signal, of wavelength λ1.

The first entering sub-signal RF_in_1 is preferably converted by the first laser source 215 of the first conversion module 205*a*. Said first laser source 215 of the first conversion module emits, at the output, the first entering optical signal, of wavelength λ1.

By analogy, the second conversion module 205*b* advantageously converts the second entering sub-signal RF_in2 coming from the first filtering device 201 into a second entering optical signal, of wavelength λ1.

The second entering sub-signal RF_in_2 is preferably converted by the first laser source 215 of the second conversion module 205*b*. Said first laser source 215 of the second conversion module emits, at the output, the second entering optical signal, of wavelength λ1.

To ensure the bidirectional transmission of the signals in each optical fiber, each conversion module further includes the first multiplexer 235.

Thus, the first entering optical signal, of wavelength λ1, is transmitted to the first multiplexer 235 of the first conversion module 205*a* before its transmission in the first optical fiber 400*a*. Likewise, the second entering optical signal, of wavelength λ1, is transmitted to the first multiplexer 235 of the second conversion module 205*b* before its transmission in the second optical fiber 400*b*.

At the output of the first conversion module 205*a*, the first entering optical signal, of wavelength λ1, is transmitted, via a first optical fiber 400*a*, to each interface box 300.

At the output of the second conversion module 205*b*, the second entering optical signal, of wavelength λ1, is transmitted, via a second optical fiber 400*b*, to each interface box 300.

The wavelengths of the entering optical signals in each optical fiber 400*a*, 400*b* are preferably chosen so as to be identical. Such a choice advantageously allows to use identical conversion units in each interface box 300.

In an exemplary embodiment, the two optical fibers 400*a*, 400*b* are preferably monomodal. However, nothing excludes using multimodal optical fibers. Preferably, the optical fibers are identical. In a non-limiting exemplary embodiment, the wavelength λ1 in each optical fiber is 1310 nm. Nothing excludes, however, using other wavelengths, in particular all those between 1270 nm and 1550 nm, without this being restrictive to the invention.

Since each interface box 300 is identical, only the operation of one interface box will be described in an illustrated manner. The other interface boxes 300 operate in an analogous manner.

Each optical coupler of the interface box 300 is coupled to an optical fiber.

The first coupler 306*a* is advantageously arranged and configured to:
- receive the first entering optical signal, of wavelength λ1, transported by the first optical fiber 400*a*, and
- transmit on the one hand a part of said first entering optical signal to the first coupler 306*a* of the following interface box and on the other hand the other part of said first entering optical signal to the first conversion unit 305*a*.

By analogy, the second coupler 306*b* is advantageously arranged and configured to:
- receive the second entering optical signal, of wavelength λ1, transported by the second optical fiber 400*b*, and
- transmit on the one hand a part of said second entering optical signal to the second coupler 306*b* of the following interface box and on the other hand the other part of said second entering optical signal to the second conversion unit 305*b*.

Preferably, the two optical couplers are identical. Each optical coupler is for example an 80/20 optical coupler, that is to say that 80% of the entering optical signal is transmitted to the following interface box and 20% of the entering optical signal is transmitted to the associated conversion unit.

The role of each conversion unit of the interface box 300, in the direction of the downstream flow, is to convert optical signals into radio-frequency analogue electric signals.

The first conversion unit 305*a* advantageously reconverts the first entering optical signal, of wavelength λ1, into a first entering sub-signal RF_in1.

The first entering optical signal is preferably converted into a first entering sub-signal RF_in1 by the second photodiode 325 of the first conversion unit 305*a*.

By analogy, the second conversion unit 305*b* advantageously reconverts the second entering optical signal, of wavelength λ1, into a second entering sub-signal RF_in2.

The second entering optical signal is preferably converted into a second entering sub-signal RF_in2 by the second photodiode 325 of the second conversion unit 305*b*.

To ensure the bidirectional transmission of the signals in each optical fiber, each conversion unit further includes the second multiplexer 335.

Thus, the first entering optical signal, of wavelength λ1, is transmitted to the second multiplexer 335 of the first conversion unit 305a before its transmission to the second photodiode 325 of said first conversion unit. Likewise, the second entering optical signal, of wavelength λ1, is transmitted to the second multiplexer 335 of the second conversion unit 305b before its transmission to the second photodiode 325 of said second conversion unit.

At the output of the first conversion unit 305a, the first entering sub-signal RF_in1 is transmitted to the second signal recomposition device 302.

At the output of the second conversion unit 305b, the second entering sub-signal RF_in2 is also transmitted to the second signal recomposition device 302.

The second signal recomposition device 302 is advantageously arranged and configured to receive and combine the first entering sub-signal RF_in1, coming from the first conversion unit 305a, and the second entering sub-signal RF_in2, coming from the second conversion unit 305b, into an entering signal RF_in.

The second signal recomposition device 302 is a device that allows, in the direction of the downstream flow, to recompose the entering signal RF_in from the first entering sub-signal RF_in1 and the second entering sub-signal RF_in2.

The recomposed entering signal, at the output of the second signal recomposition device 302, and thus at the output of the interface box 300, is then intended to be transmitted to all or a part of the equipment 103 of the airplane 100.

Preferably, the recomposed entering signal, at the output of the second signal recomposition device 302, is then transmitted to an emission antenna 104 intended and configured to transmit the entering signal RF_in to all or a part of the equipment 103 of the airplane 100.

In a preferred alternative embodiment, as illustrated in FIG. 3, the interface box includes a duplexer 309. The duplexer 309 is preferably arranged between the second signal recomposition device 302 and the associated antenna 104. More precisely, the duplexer 309 is preferably arranged between the second separation and combination device 303 and the associated antenna 104. Such a duplexer 309 advantageously allows to use the same single antenna 104 for the emission and the reception of an electric signal.

The duplexer 309 is advantageously designed to operate in the range of frequencies of emission and of reception of said antenna.

Optionally, as illustrated in FIG. 3, if the power of the entering signal RF_in at the output of the second diplexer 303 is low, the interface box 300 can include a first parameterisable gain amplifier 307. This first parameterisable gain amplifier 307 is preferably arranged between said second separation and combination device 303 and the duplexer 309 of said interface box, or between the second separation and combination device 303 and the antenna 104 (if the interface box does not include a duplexer 309), to increase said power of the entering signal RF_in.

Each interface box 300 transmits to the associated antenna 104 the recomposed entering signal RF_in.

The use of a first parameterisable gain amplifier 307 in each interface box can advantageously allow to homogenise the power of all the entering signals RF_in at the output of each interface box.

Thus, the radio-frequency data transport infrastructure 1 allows, in the direction of the downstream flow, to transmit an entering signal RF_in, coming, in the non-limiting example described and associated with the drawings, from the data resource block 600, to all of the antennas 104 present in the airplane, via the interface boxes 300. The entering signal RF_in can thus be broadcast throughout the airplane 100 and received by all the equipment 103.

Direction of the Upstream Flow

A radio-frequency analogue electric signal, called exiting signal RF_out, coming from at least one of the pieces of equipment 103 is sensed by one of the antennas 104 present in the airplane.

Preferably, all or a part of the antennas 104 present in the airplane 100 are configured to sense a radio-frequency analogue signal, the frequency of which is between 400 MHz and 6 GHz.

The exiting signal RF_out is transmitted to the second filtering device 301, or, if the interface box includes a duplexer 309, to said duplexer of said interface box associated with said antenna, then transmitted to the second filtering device 301.

Optionally, as illustrated in FIG. 3, if the power of the exiting signal RF_out upstream of the second diplexer 303 is low, the interface box can include a second parameterisable gain amplifier 308. This second parameterisable gain amplifier 308 is preferably arranged between said second filtering device 301 and the duplexer 309 of said interface box, or between the second filtering device 301 and the antenna 104 (if the interface box does not include a duplexer 309), to increase said power of the exiting signal RF_out.

The second filtering device 301 of the interface box is arranged and configured to, in the direction of the upstream flow, receive and filter, on the basis of the radio frequencies, the exiting signal RF_out into:

a first exiting sub-signal RF_out1, the frequency of which is located in a first sub-band of frequencies, and a second exiting sub-signal RF_out2, the frequency of which is located in a second sub-band of frequencies.

The first and second exiting sub-signals RF_out1, RF_out2 are then respectively transmitted to the first conversion unit 305a and to the second conversion unit 305b.

The first and second sub-bands of frequencies are distinct and without overlap.

Preferably, the first and the second sub-band of frequencies cover the band of frequencies between 400 MHz and 6 GHz.

In a preferred exemplary embodiment, the first sub-band of frequencies corresponds to the range of frequencies between 400 and 999.9 MHz and the second sub-band of frequencies corresponds to the range of frequencies between 1 and 6 GHz.

In other words, the second filtering device 301 of the interface box is a device that allows, in the direction of the upstream flow, to separate the signals that have a frequency in a defined band of frequencies and the signals that have a frequency in another defined band of frequencies and transport them on two different paths.

Preferably, the second filtering device 301 of the interface box is substantially identical to the first filtering device 201 of the concentration and configuration box.

The role of each conversion unit of the interface box, in the direction of the upstream flow, is to convert received radio-frequency analogue electric signals into optical signals.

The first conversion unit 305a advantageously converts the first exiting sub-signal RF_out1 coming from the second filtering device 301 into a first exiting optical signal, of wavelength λ2.

The first exiting sub-signal RF_out_1 is preferably converted by the second laser source 315 of the first conversion unit 305a. Said second laser source emits, at the output, the first exiting optical signal, of wavelength λ2.

By analogy, the second conversion unit 305b advantageously converts the second exiting sub-signal RF_out2 coming from the second filtering device 301 into a second exiting optical signal, of wavelength λ2.

The second exiting sub-signal RF_out_2 is preferably converted by a second laser source 315 of the second conversion unit 305b. Said second laser source emits, at the output, the second exiting optical signal, of wavelength λ2.

The first exiting optical signal, of wavelength λ2, is transmitted to the second multiplexer 335 of the first conversion unit 305a before its transmission in the first optical fiber 400a. Likewise, the second exiting optical signal, of wavelength λ2, is transmitted to the second multiplexer 335 of the second conversion unit 305b before its transmission in the second optical fiber 400b.

At the output of the first conversion unit 305a, the first exiting optical signal, of wavelength λ2, is transmitted to the first coupler 306a, which transmits, in turn, via the first optical fiber 400a, to the concentration and configuration box 200.

At the output of the second conversion unit 305b, the second exiting optical signal, of wavelength λ2, is transmitted to the second coupler 306b, which transmits, in turn, via the second optical fiber 400b, to the concentration and configuration box.

The wavelengths of the exiting optical signals in each optical fiber are preferably chosen so as to be identical. Such a choice allows to use identical conversion modules in the concentration and configuration box.

In a non-limiting exemplary embodiment, the wavelength λ2 is 1550 nm. Nothing excludes, however, using other wavelengths, in particular those between 1270 nm and 1550 nm, without this being restrictive to the invention.

The first coupler 306a is configured to transmit the first exiting optical signal, of wavelength λ2, to the first multiplexer 235 of the first conversion module 205a.

By analogy, the second coupler 306b is configured to transmit the second exiting optical signal, of wavelength λ2, to the first multiplexer 235 of the second conversion module 205b.

The role of each conversion module of the interface box, in the direction of the upstream flow, is to convert optical signals into radio-frequency analogue electric signals.

The first conversion module 205a advantageously reconverts the first exiting optical signal, of wavelength λ2, coming from the associated first multiplexer 235, into a first exiting sub-signal RF_out1.

The first exiting optical signal is preferably converted into a first exiting sub-signal RF_out1 by the first photodiode 225 of the first conversion module 205a.

By analogy, the second conversion module 205b advantageously reconverts the second exiting optical signal, of wavelength λ2, coming from the associated first multiplexer 235, into a second exiting sub-signal RF_out2.

The second exiting optical signal is preferably converted into a second exiting sub-signal RF_out2 by the first photodiode 225 of the second conversion module 205b.

At the output of the first conversion module 205a, the first exiting sub-signal RF_out1 is transmitted to the first signal recomposition device 202 of the concentration and configuration box 200.

At the output of the second conversion module 205b, the second exiting sub-signal RF_out2 is also transmitted to said first signal recomposition device 202.

Said first signal recomposition device 202 is advantageously arranged and configured, in the direction of the upstream flow, to receive and combine the first exiting sub-signal RF_out1, coming from the first conversion module 205a, and the second exiting sub-signal RF_out2, coming from the second conversion module 205b, into an exiting signal RF_out.

The first signal recomposition device 202 allows, in the direction of the upstream flow, to recompose the exiting signal RF_out from the first exiting sub-signal RF_out1 and the second exiting sub-signal RF_out2.

The recomposed exiting signal RF_out, at the output of the first signal recomposition device 202 of the concentration and configuration box, is then transmitted to the data resource block 600.

Such a radio-frequency data transport infrastructure 1 advantageously allows the bidirectional transfer of the data to or intended for the equipment 103 of the cabin, via optical fibers. A preferably targeted use is the mobile network.

In a preferred exemplary embodiment, each conversion unit of an interface box 300 includes a device for activating/deactivating the second laser source 315.

Such an activation/deactivation device is advantageous, for the transport of the data in the direction of the upstream flow, when an exiting signal RF_out coming from one of the pieces of equipment 103 is sensed by several antennas 104, each of said antennas being independently connected to an interface box.

Case in Which the Radio-Frequency Data Transport Infrastructure 1 Only Includes Two Interface Boxes 300

In such a case, to avoid the second laser sources of the first conversion units of the two interface boxes 300 transmitting the same first exiting sub-signal RF_out1 on the same first optical fiber 400a, only the second laser source of the first conversion unit of one of the two interface boxes 300 is activated. The second laser source of the first conversion unit of the other interface box 300 is deactivated. Likewise, to avoid the second laser sources of the second conversion units of the two interface boxes 300 transmitting the same second exiting sub-signal RF_out2 on the same second optical fiber 400b, only the second laser source of the second conversion unit of one of the two interface boxes 300 is activated. The second laser source of the second conversion unit of the other interface box 300 is deactivated.

In a non-limiting form of implementation, in a first interface box, the second laser source 315 of the first conversion unit 305a is activated and the second laser source 315 of the second conversion unit 305b is deactivated, while in the other interface box, the second laser source 315 of the first conversion unit 305a is deactivated and the second laser source 315 of the second conversion unit 305b is activated.

Case in Which the Radio-Frequency Data Transport Infrastructure 1 Includes More Than Two Interface Boxes 300

In such a case, to avoid the second laser sources of the first conversion units of all the interface boxes 300 transmitting the same first exiting sub-signal RF_out1 on the same first optical fiber 400a, only the second laser source of the first conversion unit 305a of a first interface box is activated. All the second laser sources of the first conversion units of the other interface boxes 300 are deactivated.

Likewise, to avoid the second laser sources of the second conversion units of all the interface boxes 300 transmitting the same second exiting sub-signal RF_out2 on the same second optical fiber 400b, only the second laser source of the second conversion unit 305b of another interface box other than the first interface box is activated. All the second laser sources of the second conversion units of the other interface boxes 300 are deactivated.

In other words, only two interface boxes 300 out of the totality of the interface boxes 300 are functional in the direction of the upstream flow.

Regardless of the number of interface boxes 300 in the radio-frequency data transport infrastructure, the choice of activating/deactivating the second laser sources is programmed during the installation of the interface boxes 300 in the airplane, according to their location in the cabin 101 of the airplane. This choice can be modified later.

Preferably, the devices for activating/deactivating the second laser sources are controlled electronically.

Thus, a single exiting sub-signal is transmitted on each optical fiber.

The radio-frequency data transport infrastructure 1 was described in the context of a decomposition of the entering signal, respectively of the exiting signal, into two sub-signals, without this being limiting to the invention. In general, the entering or exiting signal (direction of the downstream or upstream flow) can be decomposed into more than two sub-bands.

In this case, the concentration and configuration box includes as many conversion modules as there are entering sub-signals. There are as many optical fibers as conversion modules and each interface box includes as many conversion units as optical fibers.

FIGS. 5 and 6 illustrate a second embodiment of the radio-frequency data transport infrastructure 1, in which the number N is equal to 3. The first filtering device 201 and the first signal recomposition device 202 of the concentration and configuration box are each in the form of a triplexer. The second filtering device 301 and the second signal recomposition device 302 of each interface box are also each in the form of a triplexer.

FIGS. 5 and 6 illustrate the example in which the number S of interface boxes 300 is two. It is clear that this embodiment also applies to the case in which the number S of interface boxes 300 is at least three.

In this second embodiment, the concentration and configuration box 200 thus has, as illustrated in FIG. 5:
the first filtering device 201, in the form of a triplexer,
three modules for converting electric/optical signals, called first 205a, second 205b and third 205c conversion modules,
the first signal recomposition device 202, in the form of a triplexer.

An interface box 300 includes, as illustrated in FIG. 6 (and by extension all the interface boxes 300):
three 1×2 optical couplers, called first 306a, second 306b and third 306c couplers,
three units for converting electric/optical signals, called first 305a, second 305b and third 305c conversion units,
the second filtering device 301, in the form of a triplexer,
the second signal recomposition device 302, in the form of a triplexer.

The role and the operation of the various elements composing this second embodiment of the radio-frequency data transport interface is identical to that described for the first embodiment, whether in the direction of the downstream flow or in the direction of an upstream flow.

In the Direction of the Downstream Flow

Succinctly, the first filtering device 201 is advantageously configured to allow the decomposition of the entering signal RF_in into three entering sub-signals that are respectively transported to the first, second and third conversion module. The entering signal RF_in is decomposed into:
a first entering sub-signal RF_in1, the frequency of which is located in a first sub-band of frequencies, and
a second entering sub-signal RF_in2, the frequency of which is located in a second sub-band of frequencies,
a third entering sub-signal RF_in3, the frequency of which is located in a third sub-band of frequencies.

The first, second and third sub-bands of frequencies are distinct and without overlap.

Preferably, the first, the second and the third sub-bands of frequencies cover the band of frequencies between 400 MHz and 3 GHz.

The first conversion module 205a converts the first entering sub-signal RF_in1 into a first entering optical signal, of wavelength $\lambda_1$. The second conversion module 205b converts the second entering sub-signal RF_in2 into a second entering optical signal, of wavelength $\lambda_1$. The third conversion module 205c converts the third entering sub-signal RF_in3 into a third entering optical signal, of wavelength $\lambda_1$. Each entering optical signal is transmitted, by an associated optical fiber, to the various interface boxes 300, as illustrated in FIG. 5. The first optical fiber 400a transports the first entering optical signal of wavelength $\lambda_1$ carrying the first entering sub-signal RF_in1. The second optical fiber 400b transports the second entering optical signal of wavelength $\lambda_1$ carrying the second entering sub-signal RF_in2. The third optical fiber 400c transports the third entering optical signal of wavelength $\lambda_1$ carrying the third entering sub-signal RF_in3.

In each interface box 300:
the first coupler 306a transmits a part of the first optical signal to the first conversion unit 305a which reconverts the first optical signal of wavelength λ1 into a first entering sub-signal RF_in1,
the second coupler 306b transmits a part of the second optical signal to the second conversion unit 305b which reconverts said second optical signal of wavelength λ1 into a second entering sub-signal RF_in2,
the third coupler 306c transmits a part of the third optical signal to the third conversion unit 305c which reconverts the third optical signal of wavelength λ1 into a third entering sub-signal RF_in3.

The second signal recomposition device 302 is advantageously arranged and configured to receive and combine the first entering sub-signal RF_in1, the second entering sub-signal RF_in2 and the third entering sub-signal RF_in3 into an entering signal RF_in.

The entering signal RF_in is transmitted to the equipment via the antenna 104.

In the Direction of the Upstream Flow

Succinctly, the exiting signal RF_out coming from one or more pieces of equipment is sensed by one or more antennas, each antenna being connected to an interface box 300.

For each interface box 300, the second filtering device 301 is advantageously configured to allow the decomposition of the exiting signal RF_out into three exiting sub-signals that are respectively transported to the first, second and third conversion units. The exiting signal RF_out is decomposed into:

a first exiting sub-signal RF_out1, the frequency of which is located in a first sub-band of frequencies, and a second exiting sub-signal RF_out2, the frequency of which is located in a second sub-band of frequencies, a third exiting sub-signal RF_out3, the frequency of which is located in a third sub-band of frequencies.

The first, second and third sub-bands of frequencies are distinct and without overlap.

Preferably, the first, the second and the third sub-bands of frequencies cover the band of frequencies between 400 MHz and 6 GHz.

The first conversion unit 305a converts the first exiting sub-signal RF_out1 into a first exiting optical signal, of wavelength λ2. The second conversion unit 305b converts the second exiting sub-signal RF_out2 into a second exiting optical signal, of wavelength λ2. The third conversion unit 305c converts the third exiting sub-signal RF_out3 into a third exiting optical signal, of wavelength λ2.

Each exiting optical signal is transmitted, by an associated optical fiber, to the various concentration and configuration boxes 200. The first optical fiber 400a transports the first exiting optical signal, of wavelength λ2 carrying the first exiting sub-signal RF_out1. The second optical fiber 400b transports the second exiting optical signal, of wavelength λ1 carrying the second exiting sub-signal RF_out2, as illustrated in FIG. 2. A third optical fiber 400c transports the third exiting optical signal, of wavelength λ2, carrying the third exiting sub-signal RF_out3.

In the configuration and concentration box:
the first conversion module 205a reconverts the first exiting optical signal of wavelength λ1 into a first exiting sub-signal RF_out1,
the second conversion module 205b reconverts the second exiting optical signal of wavelength λ1 into a second exiting sub-signal RF_out2,
the third conversion module 205c reconverts the third exiting optical signal of wavelength λ1 into a third exiting sub-signal RF_out3.

The first signal recomposition device 202 is advantageously arranged to receive and multiplex the first exiting sub-signal RF_out1, the second exiting sub-signal RF_out2 and the third exiting sub-signal RF_out3 into an exiting signal RF_out.

In this second embodiment, each conversion unit of an interface box 300 can include a device for activating/deactivating the second laser source 315. The operation of the activation/deactivation devices in the case in which the radio-frequency data transport infrastructure 1 includes two interface boxes 300 and in the case in which the radio-frequency data transport infrastructure 1 includes more than two interface boxes 300 is identical to that of the first embodiment.

The invention claimed is:

1. A radio-frequency data transport infrastructure configured to transmit radio-frequency data to an equipment, in a direction of a downstream flow, and to transmit the radio-frequency data from the equipment, in a direction of an upstream flow, comprising:

N optical fibers;
S interface boxes;
a concentration and configuration box comprising:
a first filter frequency filters in the direction of the downstream flow and decomposes an entering signal into N entering sub-signals in N distinct sub-bands of frequencies, N being an integer ≥2;

N signal converters, each signal converter, in the direction of the downstream flow, respectively converts an entering sub-signal into an entering optical signal having a first wavelength;

wherein the concentration and configuration box is coupled, via the N optical fibers to the S interface boxes disposed in series, S being an integer ≥2;

wherein each interface box comprises:
N 1×2 optical couplers;
N optical signal converters, each optical coupler, in the direction of the downstream flow, respectively transmits a part of the entering optical signal to an optical signal converter, each optical signal converter, in the direction of the downstream flow, respectively reconverts the entering optical signal into the entering sub-signal; and
a first signal multiplexer recomposes the entering signal from the N entering sub-signals obtained by the N optical signal converters.

2. The radio-frequency data transport infrastructure of claim 1, wherein said each signal converter comprises:
a first laser source;
a first photodiode; and
a first wavelength multiplexer.

3. The radio-frequency data transport infrastructure of claim 1, wherein said each optical signal converter comprises:
a second laser source;
a second photodiode; and
a second wavelength multiplexer.

4. The radio-frequency data transport infrastructure of claim 3, wherein said each optical signal converter comprises a controller to activate or deactivate the second laser source.

5. The radio-frequency data transport infrastructure of claim 1, wherein said each interface box comprises a second filter which frequency filters in the direction of the upstream flow and decomposes an exiting signal into N exiting sub-signals, in the N distinct sub-bands of frequencies;

wherein each conversion, in the direction of the upstream flow, respectively converts an exiting sub-signal from the second filter into an exiting optical signal having a second wavelength distinct from the first wavelength of the entering optical signal;

wherein each exiting optical signal is respectively transmitted, by an optical fiber to a signal converter, said each signal converter, in the direction of the upstream flow, respectively reconverts the exiting optical signal into the exiting sub-signal; and wherein the concentration and configuration box comprises a second signal multiplexer which recomposes the exiting signal from the N exiting sub-signals obtained by the N optical signal converters.

6. The radio-frequency data transport infrastructure of claim 5, wherein said each interface box comprises a duplexer arranged between the second filter and an antenna external to the radio-frequency data transport infrastructure.

7. The radio-frequency data transport infrastructure of claim 6, wherein said each interface box comprises a first parameterizable gain amplifier arranged between the first signal multiplexer and the duplexer.

8. The radio-frequency data transport infrastructure of claim 5, wherein at least one of the first filter, the first signal multiplexer, the second filter and the second signal multiplexer is in the form of a diplexer.

9. The radio-frequency data transport infrastructure of claim 5, wherein at least one of the first filter, the first signal multiplexer, the second filter and the second multiplexer is in the form of a triplexer.

10. An aircraft comprising the radio-frequency data transport infrastructure of claim 1.

* * * * *